US008627230B2

(12) United States Patent
Boehler et al.

(10) Patent No.: US 8,627,230 B2
(45) Date of Patent: Jan. 7, 2014

(54) INTELLIGENT COMMAND PREDICTION

(75) Inventors: Olivier Boehler, Montpellier Cedex (FR); Gisela C. Cheng, Poughkeepsie, NY (US); Anuja Deedwaniya, Poughkeepsie, NY (US); Zamir G. Gonzalez, Poughkeepsie, NY (US); Shayne M. Grant, Research Triangle Park, NC (US); Jagadish B. Kotra, Bangalore KA (IN)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 12/624,607

(22) Filed: Nov. 24, 2009

(65) Prior Publication Data

US 2011/0126154 A1 May 26, 2011

(51) Int. Cl.

| | |
|---|---|
| ***G06F 7/00*** | (2006.01) |
| ***G06F 3/048*** | (2013.01) |
| ***G06F 3/033*** | (2013.01) |
| ***G10L 15/00*** | (2013.01) |
| ***G10L 21/00*** | (2013.01) |

(52) U.S. Cl.

USPC .... 715/811; 707/722; 707/758; 707/E17.014; 707/E17.032; 707/999.006; 707/999.102; 707/736; 704/231; 704/240; 704/246; 704/250; 704/273; 715/863

(58) Field of Classification Search

USPC .......... 715/811, 863; 707/736, E17.044, 722, 707/758, E17.014, E17.032, 999.006, 707/999.102; 706/52; 704/231, 240, 246, 704/250, 273

See application file for complete search history.

(56) References Cited

U.S. PATENT DOCUMENTS

| | | | | |
|---|---|---|---|---|
| 6,622,119 | B1 * | 9/2003 | Ramaswamy et al. | 704/9 |
| 7,284,009 | B2 | 10/2007 | Perrow | |
| 7,827,170 | B1 * | 11/2010 | Horling et al. | 707/722 |
| 2006/0075488 | A1 * | 4/2006 | Barrett et al. | 726/22 |
| 2007/0071209 | A1 * | 3/2007 | Horvitz et al. | 379/201.06 |
| 2008/0316925 | A1 * | 12/2008 | Dolin et al. | 370/232 |
| 2010/0082649 | A1 * | 4/2010 | Gutt et al. | 707/758 |

OTHER PUBLICATIONS

Brian D. Davison, et al., Probabilistic Online Action Prediction, Presented at the 1998 AAAI Spring Symposium on Intelligent Environments, 7 pages.

Kenichi Yoshida, User Command Prediction by Graph-Based Induction, Copyright 1994 IEEE, pp. 732-735.

* cited by examiner

*Primary Examiner* — Alvin Tan
*Assistant Examiner* — Rinna Yi
(74) *Attorney, Agent, or Firm* — Cantor Colburn LLP; William A. Kinnaman, Jr.

(57) ABSTRACT

A method, system, and computer program product for intelligent command prediction are provided. The method includes determining a command prediction preference associated with a user from user profile data, and selecting one or more command history repositories responsive to the command prediction preference. The one or more command history repositories include command history data collected from a plurality of users and classification data associated with the plurality of users. The method also includes calculating command probabilities for commands in the command history data of the selected one or more command history repositories as a function of the classification data associated with the plurality of users in relation to the user. The method additionally includes presenting a next suggested command as a command from the command history data of the selected one or more command history repositories with a highest calculated command probability.

14 Claims, 2 Drawing Sheets

INTELLIGENT COMMAND PREDICTION

BACKGROUND

The present invention relates generally to computer command processing, and more specifically, to providing computer system users with intelligent command predictions.

Some computer systems retain a buffered list of recently used commands. When a user desires to input a command from a command line input interface, the user may have an option of scrolling through the buffered list and selecting one of the recently used commands as the current command. Since some commands may be repeated frequently, such as change directory commands when navigating through a file system, scrolling through the buffered list to select a command may be faster than retyping the command. Additionally, some commands can include long strings of attributes or special flags that may be cumbersome for a user to remember and increases the likelihood of the user making a typographical error. More advanced command prediction logic may track a sequence of commands entered by the user and attempt to predict which command the user is most likely to desire next based on the user's previously entered commands.

SUMMARY

An exemplary embodiment is a method for intelligent command prediction. The method includes determining a command prediction preference associated with a user from user profile data, and selecting one or more command history repositories responsive to the command prediction preference. The one or more command history repositories include command history data collected from a plurality of users and classification data associated with the plurality of users. The method also includes calculating command probabilities for commands in the command history data of the selected one or more command history repositories as a function of the classification data associated with the plurality of users in relation to the user. The method additionally includes presenting a next suggested command as a command from the command history data of the selected one or more command history repositories with a highest calculated command probability.

Another exemplary embodiment is a system for intelligent command prediction. The system includes a data storage system with user profile data and one or more command history repositories. The one or more command history repositories include command history data collected from a plurality of users and classification data associated with the plurality of users. The system also includes intelligent command prediction logic configured to execute on one or more servers and communicate with the data storage system and one or more command interfaces. The intelligent command prediction logic is configured to determine a command prediction preference associated with a user from the user profile data, and select one or more of the one or more command history repositories responsive to the command prediction preference. The intelligent command prediction logic is also configured to calculate command probabilities for commands in the command history data of the selected one or more command history repositories as a function of the classification data associated with the plurality of users in relation to the user. The intelligent command prediction logic is additionally configured to present a next suggested command as a command from the command history data of the selected one or more command history repositories with a highest calculated command probability.

A further exemplary embodiment is a computer program product for intelligent command prediction. The computer program product includes a storage medium readable by a processing circuit and storing instructions for execution by the processing circuit for implementing a method. The method includes determining a command prediction preference associated with a user from user profile data, and selecting one or more command history repositories responsive to the command prediction preference. The one or more command history repositories include command history data collected from a plurality of users and classification data associated with the plurality of users. The method also includes calculating command probabilities for commands in the command history data of the selected one or more command history repositories as a function of the classification data associated with the plurality of users in relation to the user. The method further includes presenting a next suggested command as a command from the command history data of the selected one or more command history repositories with a highest calculated command probability.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments of the present invention provide intelligent command prediction to assist users in quickly selecting and issuing commands. To enhance command prediction accuracy, rather than relying exclusively on previous commands entered by a user, the intelligent command prediction logic collects and analyzes historical command data based on one or more of: a system grouping, user role, and time of command execution. Thus, the intelligent command prediction not only accounts for previously issued commands from the same user, but also factors in data from other users who are part of the same system grouping, who have the same role, and/or perform actions at a similar time. This larger data set can improve the accuracy of predictions since other users with similar attributes may perform similar sequences of activities. Configurable user profiles allow for user-specific feature customization, such as which type of data to include in command prediction calculations and the number of suggestions desired. User profiles may also support adjustable weightings to consider multiple factors and favor selected data sources more heavily over other data sources in determining probabilities of predicted commands.

Figure 1:
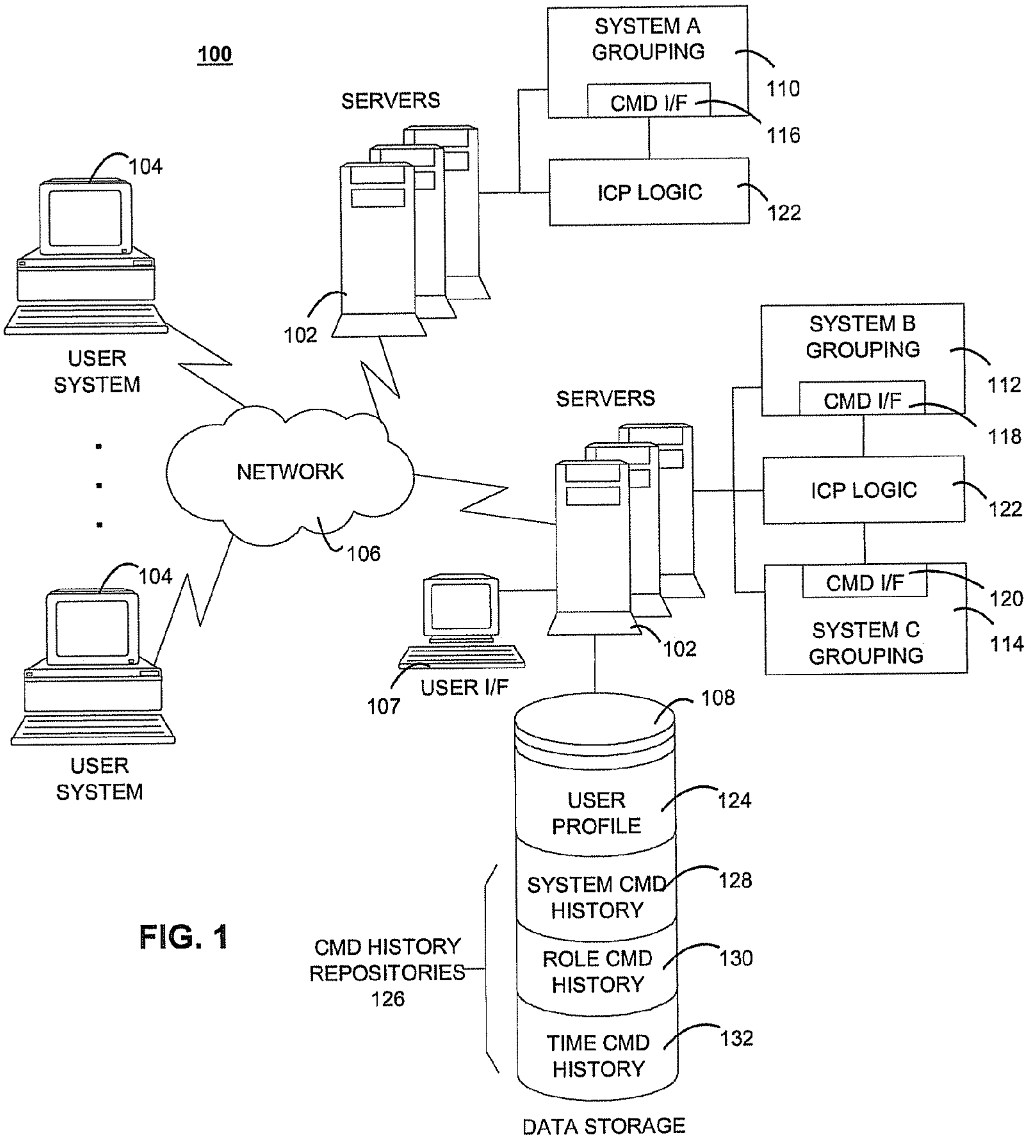
FIG. 1 depicts an example of a system for intelligent command prediction in accordance with exemplary embodiments.

Turning now to the drawings, it will be seen that in FIG. 1 there is a block diagram of a system 100 upon which intelligent command prediction is implemented in exemplary embodiments. The system 100 of FIG. 1 includes servers 102 in communication with user systems 104 over a network 106. In exemplary embodiments, the servers 102 are high-speed processing devices (e.g., a mainframe computer, a desktop computer, a laptop computer, or the like) including at least one processing circuit (e.g., a CPU) capable of reading and executing instructions, and handling numerous interaction requests from the user systems 104.

In exemplary embodiments, the user systems 104 comprise desktop, laptop, general-purpose computer devices, and/or networked devices with processing circuits and I/O interfaces, such as a keyboard and display device. The servers 102 and user systems 104 can include various computer hardware and software technology known in the art, such as one or more processing units or circuits, volatile and non-volatile memory including removable media, power supplies, network interfaces, support circuitry, operating systems, and the like. The servers 102 may also include one or more user interfaces 107 with user accessible I/O devices, such as a keyboard, mouse, and display. The one or more user interfaces 107 enable one or more local users to access the servers 102, as an alternate or additional means of providing input and receiving intelligent command prediction output.

The network 106 may be any type of communications network known in the art. For example, the network 106 may be an intranet, extranet, or an internetwork, such as the Internet, or a combination thereof. The network 106 can include wireless, wired, and/or fiber optic links. Additional computer systems (not depicted) can also be accessed via the network 106 or other networks.

The data storage system 108 refers to any type of computer readable storage medium and may comprise one or more secondary storage elements, e.g., hard disk drive (HDD), tape, or a storage subsystem that is internal or external to the servers 102. Types of data that may be stored in the data storage system 108 include, for example, various files and databases. It will be understood that the data storage system 108 shown in FIG. 1 is provided for purposes of simplification and ease of explanation and is not to be construed as limiting in scope. To the contrary, there may be multiple data storage systems 108 utilized by the servers 102, which can be distributed in various locations of the system 100.

The servers 102 can include multiple physical resources and logical resources to implement a variety of system groupings. The servers 102 can be clustered into groups, which may be distributed across the network 106, with shared access to data storage system 108. For example, system A grouping 110, system B grouping 112, and system C grouping 114 represent homogeneous system groupings that are configured to run one or more specific application per grouping on the servers 102, such as database applications, web services, or application servers. In exemplary embodiments, the homogeneous system groupings are grouped according to similarly provided services, for instance, database services. Each of the system groupings may have command interfaces that enable users of the user systems 104 and/or user interfaces 107 to issue commands to the system groupings. For instance, command interface 116 allows users to issue commands to system A grouping 110, command interface 118 enables users to issue commands to system B grouping 112, and command interface 120 facilitates issuing of commands to system C grouping 114.

The servers 102 also execute intelligent command prediction (ICP) logic 122. The ICP logic 122 communicates with the data storage system 108 and one or more of the command interfaces 116-120 to track commands entered by users and offer one or more suggestions as the next commands for the users. The ICP logic 122 can be located on any of the servers 102 or distributed between the servers 102, including separate instances dynamically instantiated on a per user basis. Users may interface with the command interfaces 116-120 from user system 104 over network 106 and/or from user interfaces 107. The ICP logic 122 can capture commands input via the command interfaces 116-120. Data associated with users can be stored in user profile data 124 on data storage system 108. The ICP logic 122 may write the captured commands to command history repositories 126 on data storage system 108 in records associated with the users. As the users issue commands, command histories in the command history repositories 126 are populated to increase the data set. The command histories in the command history repositories 126 can be configured as first-in-first-out buffers or circular queues to retain a maximum number of data values, discarding the oldest values to prevent excessive data collection.

The command history repositories 126 can be implemented as a single repository or a collection of repositories. For example, the command history repositories 126 may include a system grouping command history repository 128, a role-based command history repository 130, and a time-based command history repository 132. In one embodiment, user identification information is a primary key for linking data between the command history repositories 126. Alternatively, one or more index values can be used to cross-reference data between the command history repositories 126. Further details about the user profile data 124 and the command history repositories 126 in relation to the ICP logic 122 are provided herein.

An example of a subset of user profile data 124 is provided in Table 1. As shown in Table 1, the user profile data 124 can include user identification information, preferences, and a number of suggestions desired. The preferences may indicate command prediction preferences, such as whether the ICP logic 122 should calculate command probabilities using one or more of the system grouping command history repository 128, role-based command history repository 130, and time-based command history repository 132. The user profile data 124 may also include weightings associated with the command prediction preferences, indicating that a greater weighting should be given to preferred classification data of the selected command history repositories. The number of suggestions desired indicates how many predicted commands should be presented to specific users.

TABLE 1

Example Subset of User Profile Data

| UserID | Preferences | Number of suggestions desired |
|---|---|---|
| User1 | Role based | 5 |
| User2 | Time based | 10 |
| User3 | Individual based | 3 |

An example of a subset of the system grouping command history repository 128 is provided in Table 2. In this example, user identification information, system grouping information, and command histories are included in the system grouping command history repository 128. The system grouping information is one type of classification data associated with the users. System grouping information can correspond to particular applications, distributed environments, services, or application servers to which users issue commands. For instance, as depicted in Table 2, User1 has a command history for system A grouping 110, User2 has a command history for system B grouping 112, and User3 has a command history for system C grouping 114. Command histories for additional users can be associated systems groupings 110-114, as well as additional system groupings.

TABLE 2

Example Subset of System Grouping Command History Repository

| UserID | System Group | Commands |
|---|---|---|
| User1 | A Grouping | s databaseApp<br>select name from dept where manager = X |
| User2 | B Grouping | s ldap<br>ldapbind-h host-D cn = admin |
| User3 | C Grouping | s applicationServer<br>p applicationServer |

An example of a subset of role-based command history repository 130 is provided in Table 3. As shown in Table 3, the role-based command history repository 130 can include user identification information and role information, where the role information is a type of classification data. Users with different roles may have access to system groupings and issue different types of commands when accessing the same system grouping. For example, an administrator user of system A grouping 110 may run system maintenance commands, while a standard user runs different types of commands to access and update application specific data in system A grouping 110. The role-based command history repository 130 may include command histories directly or can cross-reference other repositories of the command history repositories 126 to access command histories associated with the roles.

TABLE 3

Example Subset of Role-Based Command History Repository

| UserID | Role |
|---|---|
| User1 | Administrator |
| User2 | Developer |
| User3 | User |

An example of a subset of time-based command history repository 132 is provided in Table 4. In this example, user identification information, shift, time command issued, and command histories are included in the time-based command history repository 132. The shift and time command issued are examples of classification data associated with the users. The shift need not be directly included in the time-based command history repository 132. For instance, a secondary table identifying shifts, hour ranges, and calendar information (e.g., holidays) can be used to sort and classify the time command issued information associated with the command histories and users.

TABLE 4

Example Subset of Time-Based Command History Repository

| UserID | Shift | Time Command Issued | Command |
|---|---|---|---|
| User1 | 1 | Jun. 10, 2009 14:23:07 | BIGCOMM EXEC PGM = IDCAMS |
| | | Jun. 10, 2009 14:24:12 | SYSPRINT DD SYSOUT = * |
| | | Jun. 10, 2009 14:25:43 | AMSDUMP DD SYSOUT = * |
| | | Jun. 10, 2009 14:25:54 | SYSIN DD* |
| User4 | 1 | Jun. 10, 2009 10:43:28 | MODIFY BPXOINIT |
| | | Jun. 10, 2009 11:11:12 | VARY WLM |
| User5 | 1 | Jun. 10, 2009 13:21:09 | LRQ EXEC PGM = IDCAMS |
| | | Jun. 10, 2009 13:24:43 | SYSPRINT DD SYSOUT = * |
| | | Jun. 10, 2009 13:24:58 | AMSDUMP DD SYSOUT = * |
| | | Jun. 10, 2009 13:30:31 | SYSIN DD* |

In exemplary embodiments, the ICP logic 122 uses command prediction preferences, classification data, and command history data to calculate the most probable commands for the user to issue next. Any combination of the command history repositories 126 can be used to classify and filter the commands considered in command probability calculations for a specific user. For instance, if classification data from across the command history repositories 126 are preferred, the following pseudo SQL statement could be used:

```
SELECT Command FROM master_repository
    WHERE
        Homogenous_System_Group = <group name>
    AND
        User = <user>
    AND
        Role = <role>
    AND
        ( Shift = <current shift> AND|OR Weekday = <is
currently weekday> AND|OR Holiday = <is currently holiday> )
SORT BY Frequency_Used.
```

Figure 2:
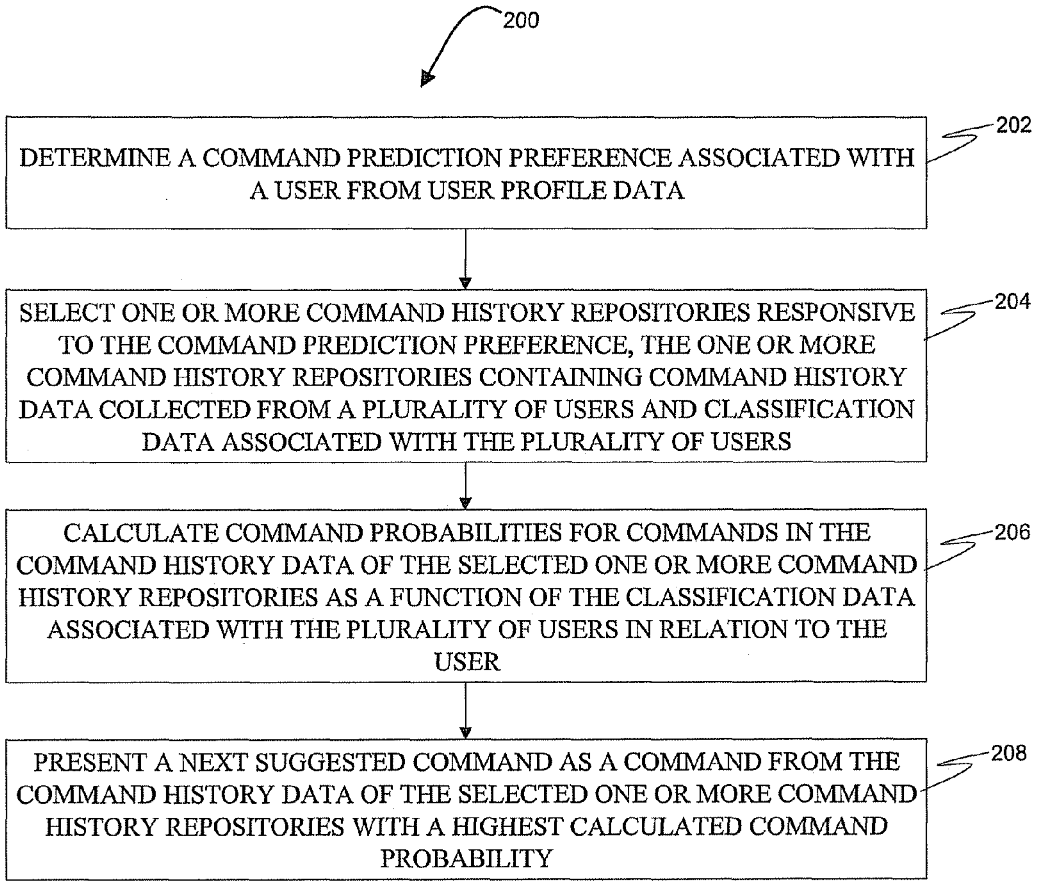
FIG. 2 depicts an exemplary process for intelligent command prediction in accordance with exemplary embodiments.

Turning now to FIG. 2, a process 200 for intelligent command prediction will now be described in accordance with exemplary embodiments, and in reference to FIG. 1. At block 202, the ICP logic 122 determines a command prediction preference associated with a user from user profile data 124. At block 204, the ICP logic 122 selects one or more command history repositories 126 responsive to the command prediction preference. The one or more command history repositories 126 include command history data collected from a plurality of users and classification data associated with the plurality of users. One or more the command history repositories 126 from which the selection is performed can include the system grouping command history repository 128, the role-based command history repository 130, and the time-based command history repository 132.

At block 206, the ICP logic 122 calculates command probabilities for commands in the command history data of the selected one or more command history repositories 126 as a function of the classification data associated with the plurality of users in relation to the user. The command probabilities may be calculated from a frequency of use of the commands as determined from the command history data of the selected one or more command history repositories 126 where the classification data associated with the plurality of users matches a classification associated with the user. Alternatively, the command probabilities can be calculated according to weightings associated with the command prediction preference, giving a greater weighting to preferred classification data of the selected one or more command history repositories 126.

Additional time-based actions can be performed in determining command probabilities as a function of time. For example, the ICP logic 122 can sort commands in the time-based command history repository 132 as time groups by work shift, workdays, weekend days, and holidays, filtering the commands used in calculating the command probabilities to align with one of the time groups corresponding to a time that the user is presented with the next suggested command. Time based groupings can account for differences in typical actions performed during peak and non-peak hours, weekends, and holidays, such as various maintenance activities.

At block 208, the ICP logic 122 presents a next suggested command as a command from the command history data of the selected one or more command history repositories 126 with a highest calculated command probability. The ICP logic 122 may present multiple options to the user by reading a number of suggestions desired associated with the user from the user profile data 124, and presenting additional suggested commands in descending order from the highest calculated command probability until the number of suggestions desired have been presented to the user. The ICP logic 122 can also capture commands input by the plurality of users, and write the captured commands to the one or more command history repositories 126 in records associated with the plurality of users.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized to store instructions for execution of the ICP logic 122 of FIG. 1. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include predicting one or more commands that a user may desire to execute next based on data collected from multiple users. Command histories are collected and classified to determine probabilities of a likely next command or sequence of commands. Accounting for features such as system grouping, user role, and time-based activities, similar profiles of activity patterns are developed from which predictions under similar conditions can be made with a higher degree of accuracy than limiting predictions to only past commands issued by the same user.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A method for intelligent command prediction, comprising:

determining a command prediction preference associated with a user from user profile data, the user profile data comprises user identification information, user preferences and a number of command suggestions desired, wherein the user preferences includes a plurality of command history repositories and a weighting associated with each repository, the plurality of command history repositories including a system grouping command history repository, rolebased command history repository and a time-based command history repository;

selecting one or more of the plurality of command history repositories responsive to the command prediction preference, the command history repositories comprising command history data collected from a plurality of users and classification data associated with the plurality of users;

calculating command probabilities for commands in the command history data of the selected command history repositories as a function of a number of times the commands were used and a function of the classification data associated with the plurality of users in relation to the user;

presenting a next suggested command as a command from the command history data of the selected command history repositories with a highest calculated command probability;

sorting commands in the time-based command history repository as time groups by work shift, workdays, weekend days, and holidays; and filtering the commands used in calculating the command probabilities to align with one of the time groups corresponding to a time that the user is presented with the next suggested command.

2. The method of claim 1 further comprising:

reading the number of command suggestions desired associated with the user from the user profile data; and presenting additional suggested commands in descending order from the highest calculated command probability until the number of command suggestions desired have been presented to the user.

3. The method of claim 1 wherein the command probabilities are calculated from a frequency of use of the commands as determined from the command history data of the selected command history repositories where the classification data associated with the plurality of users matches a classification associated with the user.

4. The method of claim 1 wherein the command probabilities are calculated according to the weightings, giving a greater weighting to preferred classification data of the selected command history repositories.

5. The method of claim 1 further comprising:

capturing commands input by the plurality of users; and writing the captured commands to the one or more of the plurality of command history repositories in records associated with the plurality of users.

6. A system for intelligent command prediction, comprising:

a data storage system comprising:

user profile data comprising a user identification information, a user preference and a number of command suggestions desired, wherein the user preference includes a plurality of command history repositories and a weighting associated with each repository, the plurality of command history repositories including a system grouping command history repository, role-based command history repository and a time-based command history repository, each of the plurality of command history repositories comprising command history data collected from a plurality of uses and clarification data associated with the plurality of user;

intelligent command prediction logic configured to execute on one or more servers and communicate with the data storage system and one or more command interfaces, the intelligent command prediction logic further configured to perform:

determining a command prediction preference associated with a user from the user profile data;

selecting one or more of the plurality of command history repositories responsive to the command prediction preference;

calculating command probabilities for commands in the command history data of the selected command history repositories as a function of a number of times the commands were used and a function of the classification data associated with the plurality of users in relation to the user;

presenting a next suggested command as a command from the command history data of the selected command history repositories with a highest calculated command probability; sorting commands in the time-based command history repository as time groups by work shift, workdays, weekend days, and holidays; and filtering the commands used in calculating the command probabilities to align with one of the time groups corresponding to a time that the user is presented with the next suggested command.

7. The system of claim 6 wherein the intelligent command prediction logic is further configured to perform:

reading the number of command suggestions desired associated with the user from the user profile data; and presenting additional suggested commands in descending order from the highest calculated command probability until the number of command suggestions desired have been presented to the user through one of the one or more command interfaces.

8. The system of claim 6 wherein the command probabilities are calculated from a frequency of use of the commands as determined from the command history data of the selected command history repositories where the classification data associated with the plurality of users matches a classification associated with the user.

9. The system of claim 6 wherein the command probabilities are calculated according to the weightings, giving a greater weighting to preferred classification data of the selected command history repositories.

10. A computer program product for intelligent command prediction, the computer program product comprising:

a non-transitory storage medium readable by a processing circuit and storing instructions for execution by the processing circuit for implementing a method, the method comprising:

determining a command prediction preference associated with a user from user profile data, the user profile data comprises user identification information, user preferences and a number of command suggestions desired, wherein the user preferences includes a plurality of command history repositories and a weighting associated with each repository, the plurality of command history repositories including a system grouping command history repository, role-based command history repository and a time-based command history repository;

selecting one or more of the plurality of command history repositories responsive to the command prediction preference, the command history repositories comprising command history data collected from a plurality of users and classification data associated with the plurality of users;

calculating command probabilities for commands in the command history data of the selected command history repositories as a function of a number of times the commands were used and a function of the classification data associated with the plurality of users in relation to the user;

presenting a next suggested command as a command from the command history data of the selected command history repositories with a highest calculated command probability; sorting commands in the time-based command history repository as time groups by work shift, workdays, weekend days, and holidays; and filtering the commands used in calculating the command probabilities to align with one of the time groups corresponding to a time that the user is presented with the next suggested command.

11. The computer program product of claim 10 wherein the method further comprises:

reading the number of command suggestions desired associated with the user from the user profile data; and presenting additional suggested commands in descending order from the highest calculated command probability until the number of command suggestions desired have been presented to the user.

12. The computer program product of claim 10 wherein the command probabilities are calculated from a frequency of use of the commands as determined from the command history data of the selected command history repositories where the classification data associated with the plurality of users matches a classification associated with the user.

13. The computer program product of claim 10 wherein the command probabilities are calculated according to the weightings, giving a greater weighting to preferred classification data of the selected command history repositories.

14. The computer program product of claim 10 wherein the method further comprises:

capturing commands input by the plurality of users; and writing the captured commands to the one or more command history repositories in records associated with the plurality of users.

* * * * *